Patented May 3, 1927.

1,627,195

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

METHOD OF OBTAINING COLORED POLYMERIZED STYROL AND ITS HOMOLOGUES AND PRODUCTS OBTAINED THEREBY.

No Drawing.    Application filed January 29, 1925. Serial No. 5,457.

This invention relates to methods of obtaining colored polymerized styrol and its homologues and to the products obtained thereby.

Polymerized styrol may be colored by adding pigments thereto. Such a method of coloring is limited to the formation of opaque colored masses. According to the present invention processes have been developed for preparing colored polymerized styrol which may retain its transparent properties, at the same time possessing fluorescence. By the present process it is possible to obtain an extremely wide variety of shades and tones far beyond the few colors which can be obtained with the usual pigments.

With a preferred embodiment in mind and without intention to limit the invention beyond what is required by the prior art, the invention briefly consists in combining with unpolymerized styrols coloring matter which is soluble in unpolymerized styrols and in the polymerized styrols. It also consists in forming polymerized styrols from solutions of such colors in liquid styrol. The invention also relates to methods of obtaining transparent colors, which may or may not be fluorescent.

The word homogeneous used hereafter is meant to signify, when applied to colored polymerized styrol, a continuous and unbroken color throughout the mass, as differentiated from styrol colored with pigments. When the ordinary pigments are used the color is non-homogeneous for the reason that the color is imparted by the pigment. Upon careful examination of fragments of the polymerized product it will be seen that the color does not extend through all of the styrol but only around the pigment particle.

The word transparent as used hereinafter is not meant to signify the transparency which is observed in the absence of any coloring material but rather to designate the type of colored polymerized styrol whose color is homogeneous throughout its entire mass and through which light will pass readily. It is obvious that as the amount of coloring matter is increased the glass may vary through the entire range from almost water white, through transparency, translucency into opacity, still preserving its color.

The word styrol glass is used hereinafter to signify the polymerized styrol.

The word styrol is used throughout this application as signifying styrol and its homologues.

It has been discovered that a number of coloring materials are soluble in liquid styrol, that is unpolymerized styrol, and that many of these coloring materials are likewise soluble in styrol glass. These properties are by no means general in the realm of dyestuffs such as organic chemicals. As a matter of fact most of the materials mentioned hereinafter have found very little application in the ordinary fields of dyeing. It has further been discovered that a number of the coloring materials which are soluble both in styrol and in styrol glass retain their color unchanged or but slightly altered by the polymerization step which is carried out at 140°–175° C. to form vitreous styrol glass, or higher to form brittle glass.

This method of coloring styrol glass makes it possible to obtain remarkable results in purity of tint, even distribution of the coloring material, as well as in the optical and other physical properties of the glass. Dyes which lend themselves to the process must have the following qualifications: (1) They must be soluble both in liquid styrol and in styrol glass; (2) they must be unaffected by high temperatures such as 140–175° C; (3) they must be difficult to reduce into the corresponding leuco compounds at these temperatures; (4) they must not be affected by the formaldehyde which is ordinarily formed during the polymerization of styrol; (5) they must possess fairly high stability towards light.

The greater part of the dyes which are sold on the market do not conform with the above requirements and therefore do not lend themselves to use in this process. When styrol is polymerized at 140° C., most of the dyes on the market are subjected to decolorization or charring, and the outcome is that they take on a heterogeneous uneven or dirty tint and frequently form resinous substances.

In carrying out the invention, it became therefore necessary to develop new coloring matters and to improve the known processes for dyes which might be used. It is noted that a great many of the dyes used in this invention have not been given any great practical application, such as in the dyeing of fabrics.

The following materials have been found suitable for carrying out the process of this invention:

Homofluorindine=fluorindine.
Monophenylfluorindine.
Diphenylfluorindine.
Monochlordiphenylfluorindine.
Dichlordiphenylfluorindine.
Monoanilidodiphenylfluorindine
Dianilidodiphenylfluorindine.
Naphthanthraquinone.
Decacyclene.
Cinnamylidenfluorene.
Triphendioxazine.
Triphenazinoxazine.
Mesoanthramine.
Diiminodianthrone.
Acetylmesoanthramine.
Diaminodianthryl.
Naphthanthracene.
Phenyl-alpha-naphthylamine.
Thiophenyl-beta-naphthylamine.
Thiophenyl-alpha-naphthylamine.
Phenylhydrazone of phenylvinylketone.
Fluorocyclene.
Anthracene (purissimo).
Leuco base of thioindigo blue G.
Leuco base of thioindigo violet C.
Quinone (free base).
Phenylazodiaminopyridine.
Magdala red (free base).
High-boiling fractions of some kinds of naphtha.
Extract of cork in styrol.
Extract of incomplete combustion products in styrol.
Chloranilinoaposafranin.
Anilinoaposafranin.
Products formed in the explosion of mixtures of steam, styrol and air.

The most varied tints can be obtained with fluorindines; in the form of free bases, these substances impart to metastyrol a rose, red, violet or bluish-violet coloring with a yellow or red fluorescence. The intensity and the depth of shade of these colors depend, of course, upon the concentration of the particular fluorindine. When used in the form of salts they produce the most varied shades and hues of blue.

The fluorindine salts of the following acids have been applied successfully: hydrochloric, formic, propionic, valeric, caprylic, stearic, palmitic, carbolic, resorcyclic, benzoic, methoxybenzoic (ortho), phthalic, terephthalic, cinnamic, salycylic, alpha-naphthylorthobenzoic, chloracetic, trichloracetic, benzolsulphonic.

The fluorindine salts of oxalic, uric, anthranilic, sulfanilic and glycocolic acids do not appear to dissolve in styrol.

If there is an excess of fluorindine in the styrol solution the glass obtained will display a red or brown fluorescence above its color, and the fluorescence is usually quite intense. If, however, an excess of free acid be present, the fluorescence may disappear without a trace.

In the polymerization of styrol a dissociation of the fluorindine salts can be observed. Therefore the freshly obtained glass displays, especially when hot, the coloring and the fluorescence of the free fluorindine. However, in storage this coloring gradually changes to blue. The fluorindine salts which under the action of the high polymerization temperature decompose to their constituent parts, are again formed more or less quickly at normal temperature. Sometimes this formation of salt lasts some 1-2 months, at other times it is complete in a few days or even hours. The ultimate coloring of the styrol glass becomes identical with that of the original styrol. The higher the dissociation constant in the original acid, and the degree of basicity of the given fluorindine, the quicker will the reverse formation of the salts take place. Among the dyes of the series which were investigated the basic character is most salient in mono-and-dianilidodiphenylfluorindine; the strongest acids we used for this process were the hydrochloric and chloracetic.

When styrol is polymerized in the presence of a fairly large excess of acid (such as for instance ortho-methoxy-benzoic acid) the fluorindine salt does not dissociate at all. The blue color of freshly-made styrol glass, which in this case is altogether similar to that of the original styrol, does not in any way change during the ageing of the substance.

The majority of organic compounds dissolve much more readily in styrol than in styrol glass. Therefore towards the end of the polymerization process, or if the styrol contains too great an excess of organic acids, the latter will sometimes crystallize, usually causing a general or partial cloudiness in the product. Consequently, care must be taken not to introduce too great an excess of organic acids. Furthermore the fact must be taken into consideration that too large a percentage of these acids may lower the plasticity point of a glass quite appreciably and thereby interfere in the subsequent formation of the glass into articles.

As a specific example of the manner in which the invention is carried out, the following is given: A saturated solution of orthomethoxybenzoic acid at 0° C. is prepared in styrol. Into this solution pure styrol to the amount of 30% is added. Into the resultant mixture a saturated styrol solution of a fluorindine, say dianilidodiphenylfluorindine, is introduced by degrees, either drop by drop or in small portions until the solution has obtained the desired color, blue in this case. The colored styrol is then polymerized for 18 hrs. at 140° C. in a vessel fitted with a reflux condenser and after this the heating is continued for 5 hrs. at 175° C. If desired, the polymerization can be carried out at 140° C. for 40 hrs., using a reflux condenser. After cooling the polymerized product is removed from the container and heated for 2 or 3 hrs. at 90° C.

Styrol glass which has been colored by the free base of a fluorindine to a rose, red or violet can be changed to blue by treatment with hydrochloric acid. This is done by placing the glass in a vessel through which a current of dry hydrogen chloride is passed at 100° C. The same general reaction takes place when a fluorindine-colored glass is kept in fuming aqueous hydrochloric acid at ordinary temperature, a characteristic blue tint gradually forming and spreading from the outer surface towards the center of the piece of glass. It is evident that the hydrochloric acid has the property of diffusing in the presence of bases into styrol glass, to form the corresponding salt of the dye. The duration of the process varies between several days and several months depending upon the size of the lump of glass. The following are illustrations of the colors and shades obtained with various dyes:

Triphenodioxazine. To a styrol solution of this dye saturated at 0° C., 20–80% of pure styrol is added. After polymerization the fresh glass shows a slight amber coloring and green fluorescence, but after storage for a time the glass has an amber yellow color with an orange tone and shows a green fluorescence.

Naphthanthraquinone (0.15%–0.2%) colors styrol glass to a golden-yellow tint of a pure shade without any fluorescence. This substance somewhat retards the polymerization of the styrol itself, and if added in large quantities, it will lower the plasticity point of the latter. In the presence of naphthanthraquinone the styrol must be polymerized for 20 hours at 140° C. and further for 5 hours at 175° C.

Decacyclene (solution saturated at 0° C. plus 18% of pure styrol) colors styrol glass to yellow with a pure green fluorescence very much like applegreen.

Cinnamylidene-fluorene added to styrol gives a pure yellow color which, however, after polymerization turns to an ugly brown tint.

Mesoanthramine (0.02%–0.08%) turns styrol to a yellow color of a not altogether pure tint with a deep green fluorescence. In the presence of merely traces of mesoanthramine, styrol glass takes on a pure yellow coloring free from fluorescence.

Diaminodianthryl (0.1%–0.01%) dyes styrol glass to a deep and pure yellow with a very intense emerald-green fluorescence. In the presence of just traces of this substance, the styrol glass will not show any fluorescence but takes on a very pale green color of the emerald shade also. If added in the amount of 0.1%, diaminodianthryl is apt to lower appreciably the plasticity point of the styrol glass and to retard its polymerization. Therefore it is necessary to conduct this process for 50 hours at 140° C. and further for 5 hours at 175° C.

Dyestuffs of the indigo and thioindigo series when heated in styrol to 140° C. will be transformed to the corresponding leuco compounds. In this connection it has been found that many of the leuco compounds of the thioindigo dyes in styrol glass show a very vivid green fluorescence. This phenomenon is especially pronounced in solutions of indigo blue G and thio indigo blue-violet B. In a suitable concentration they color the glass to a pale orange tint, or else they leave the glass colorless (at any rate when in a thin sheet), but with a strong fluorescence: Formula: 10 ccm. of 0.17% thio indigo blue or violet solution are introduced into 50 ccm. of pure styrol (as a matter of fact 0.05 gms. of the dye should be previously dissolved in 30 ccm. of styrol). The resulting mixture (0.28%) is then polymerized with a reflux condenser for 17 hours at 140° C. and then for 3 hours at 175 without the latter. After the styrol glass has been removed from the vessel in which it was polymerized, it is again heated for 10 hours at 100° C.

Chloranilinoaposafranin dyes boiling styrol to a reddish brown tint which when the solution cools, turns to a vivid violet. If the styrol is polymerized under ordinary conditions this coloring disappears and colorless or almost colorless glass results, which however diplays a light brown fluorescence of a soft shade.

Anilinoaposafranin behaves in a similar manner to the above.

Mixtures of various substances which color styrol glass yellow (naphthanthraquinone and decacyclene are particularly easy to handle) and various salts of fluorindines produce green glass of every tint and shade. The product may display a bright red or a brown fluorescence, but in the presence of a certain excess of the acid which forms the given fluorindine salt, this fluorescence disappears without a trace. In particular, green styrol glass can be obtained by adding to the styrol solution of some fluorindine salt, an extract of lumps of cork in styrol, for such extracts are of a yellow color.

The free base, Magdala red, was isolated from the market product of this name by treatment with ammonia. This free base colors styrol glass to a reddish pink color which has a rather disagreeable brown tint. This color is not sufficiently homogeneous for some purposes.

Diiminodianthrone (0.08%) imparts to styrol glass a reddish orange tint very much like the color of apricots. In the presence of a small amount of the imine styrol glass remains colorless, taking on, however, a peculiar orange fluorescence. When diiminodianthrone is used the polymerization has to be conducted primarily at 130° C. otherwise it is the abnormal modification of metastyrol that is formed. In 18 hours the reaction temperature can be brought to 175° C. This latter part of the process must be kept up for some 15 hours.

Naphthanthracene (0.08%–0.2%) in a solution of styrol glass produces a pure yellow coloring in transmitted light at the same time imparting to the glass a bright green fluorescence of unusual intensity.

Various azo-dyes are easily decomposed or even charred in the polymerization of styrol; sometimes they impart to the glass curious tints of brown. In particular, paratolylazodiaminopyridin imparts to styrol glass a brown tint very much like tortoise shell.

Quinine (free base) gives an almost colorless product if the polymerization is carefully handled; the product displays a pale green fluorescence. However this fluorescing substance is not evenly distributed throughout the mass and it easily takes on a brown or amber tint in parts. When polymerizing styrol which contains 1% of quinine at 140° C. for 50 hours in a tube placed horizontally and provided with a reflux condenser, a very peculiar and curious product is obtained. Its coloring is not homogeneous being in places of an amber yellow and in others brown of a cocoa or burnt wood tint. These colors intermingle within the mass, forming a peculiar play of colors, or else cloudy masses.

Thiophenylbetanaphthylamine (0.08%) and thiophenylalphanaphthylamine in styrol glass shows yellow in transmitted light and also displays a very intensive green fluorescence.

Pure anthracene (0.5%–0.2%) fluorocyclene (0.1%) phenylalphanaphthylamine (0.08%) acetylmesoanthramine (0.1%) and especially phenylhydrazone of phenylvinylketones (0.05%) impart to styrol glass a violet, pure blue or bluish-violet fluorescence. Nevertheless the glass remains altogether colorless in transmitted light.

When a concentrated styrol solution of dianilidodiphenylfluorindine is added to a 0.2% styrol solution of phenylhydrazone of phenylvinylketone, until the yellow coloring entirely disappears, there is formed a solution which in polymerization under ordinary conditions produces altogether colorless glass with an amethyst fluorescence.

A definite combination of naphthanthraquinone with mono or dianilidodiphenylfluorindine gives colorless or almost colorless glass with a vivid coral pink fluorescence.

The highest fractions of several kinds of naphtha color styrol glass to a dirty-looking yellow, at the same time imparting to it a fairly strong green fluorescence.

The styrol extract of the products of incomplete combustion of styrol behaves in the same way. On the explosion of a mixture of styrol vapour with air, a product is formed which imparts an amethyst violet fluorescence to styrol glass, which is yellow in transmitted light.

By making various combinations of the materials listed in the following table and varying the concentrations of the dyes, every possible shade and tint may be imparted to styrol glass by dissolving the coloring combination in liquid styrol and subsequently polymerizing the solution.

Table I.

| Color of styrol glass. | Dyestuff. |
| --- | --- |
| I—Pink | Homofluorindine. Monophenylfluorindine. Diphenylfluorindine. Monochlordiphenylfluorindine. Magdala red (free base). |
| II—Red | Dichlordiphenylfluorindine. Monochlordiphenylfluorindine. Diphenylfluorindine. All fluorindines in suitable concentration. |
| III—Orange | Triphenodioxazin; leuco compounds of thioindigo blue G. and violet B. Mesoanthramine. Diiminodianthrone. |
| IV—Yellow | Naphthanthraquinone; naphthanthracene. Decacyclene; thiophenylbetanaphthylamine. Cinnamylidenefluorene; thiophenylalphanaphthylamine. Mesoanthramine. Diaminodianthryl. Extract of cork in styrol. Silver nitrate (0.001%). |
| V—Green | Diaminodiphenylfluorindine (either in traces or in large amounts) plus decacyclene. Naphthanthracene; diaminodianthryl. Mixtures of substances sub. IV with VI or VII. |
| VI—Light blue | Dianilidodiphenylfluorindine (negligible amount). Monoanilidodiphenylfluorindine. Salts of organic or mineral acids of all fluorindines, in a weak solution. |
| VII—Blue | All salts, organic or mineral acids of all fluorindines in a stronger concentration. Gold chloride. |
| VIII—Violet | Dianilidodiphenylfluorindine. Monoanilidodiphenylfluorindine. Mixtures of substances sub. I and II with those sub. VI and VII. |
| IX—Brown | Quinine (free base). Tolyl or phenylazodiaminopyridine. Concentrated extract of cork in styrol. Anilinoaposafranin; chloranilinoaposafranin. Silver nitrate to the amount of 0.01%–0.02%. Magdala red (free base). Products of dry distillation of many organic substances. |

As is well-known fluorescing substances transform light rays to another color, or better, they change the length of the light wave. The following table shows some of the properties of various fluorescing substances:

Table II.

| Color of radiation. | Color of transmitted light. | Fluorescing substance. |
|---|---|---|
| Blue | Colorless | Phenylhydrazone of phenylvinylketone. |
| Blue | Colorless | Fluorocyclene. |
| Blue | Colorless | Acetylmesoanthramine. |
| Violet | Colorless or slightly yellow. | Anthracene. Products formed in explosion of mixture of styrol fumes and air. |
| Blue-violet | Colorless | Phenyl-alpha naphthylamine. |
| Amethyst | Colorless | Mixtures of phenylhydrazone of phenylvinylketone and dianilidodiphenylfluorindine. |
| Coral pink | Almost colorless. | Mixture of dianilidodiphenylfluorindine and naphthanthraquinone. |
| Alizarin red | Colorless | Mono or dianilidodiphenylfluorindine in very weak solutions. |
| Yellow | Pink or red | Homo or mono or diphenylfluorindine; monochlordiphenyl, dichlordiphenylfluorindine. |
| Fire red | Violet | Mono or dianilidodiphenylfluorindine. |
| Green | Orange | Triphenodioxazine. |
| Green | Pale orange or almost colorless. | Thio-indigo blue C or violet B. (leuco compounds). |
| Green | Yellow | Diaminodianthryl. |
| Green | Brown-yellow | Mesoanthramine. |
| Green | Golden yellow | Decacyclene. |
| Green | Green of other tint. | Mixture of fluorindine salts and decacyclene. |
| Green | Green-yellow | Naphthanthracene. |
| Green | Yellowish | Thiophenyl-beta-naphthylamine or alpha naphthylamine. |
| Green | Brownish | Quinine. Products of incomplete combustion of styrol. Highest fractions of naphtha. Pyrogenization products of many organic compounds. |
| Various reds | Blue | Various fluorindine salts. |
| Vermilion | Cobalt blue | Orthomethoxybenzoic acid salt of diphenylfluorindine. |
| Brown | Colorless or light blue. | Chloranilinoasposafranin; anilinoposafranin; fluorindine salts of cinnamic acid; weak solution of monoanilidodiphenyl fluorindine, made up by special method. Many fluorindine salts. Gold chloride. |
| White | Orange or pale green. | Mixture of triphendioxazine, diphenyl fluorindine and phenyl hydrazone of phenylvinylketone. |

Many of the colors and dyes mentioned above, while not used commercially for dyeing fabrics, are suitable for coloring paraffin, wax, celluloid, acetyl cellulose and for other plastics in which the dyes will dissolve or will disperse with some readiness.

Certain inorganic salts are soluble in styrol and in styrol glass. Some of these also impart colors to the glass. Solutions of colloidal metals, particularly gold, silver, and mercury can be obtained in styrol glass. Anhydrous gold chloride, silver nitrate, or hydrohalide salts of mercury can be dissolved in styrol. When these solutions are heated to 140°–180° C. in the course of the polymerization of the styrols, colloidal solutions of the metals are formed simultaneously. It would appear that the reduction of the original salts has been accomplished by the styrol itself or by the aldehyde formed during the polymerization. It is advisable to have a small amount of styrol glass dissolved in the styrol, to function as a protective colloid.

A small amount of gold chloride which has been dried in vacuo at 80° C. is introduced into styrol containing about 3–5% of styrol glass. The resulting mixture is well shaken up and carefully heated, the temperature being raised quite gradually to the boiling point. The resulting, fairly opaque solution is quickly filtered off through a folded paper filter while still hot and then is immediately introduced in small portions into styrol containing about 5% of styrol glass until a blue coloring somewhat deeper than the desired shade is obtained. The mixture is thoroughly shaken up and if necessary is again filtered off. It is then polymerized for 25 hours at 140° C. and again 5 hours at 180° C., in the last instance without a reflux condenser. In the end styrol glass colored with colloidal gold is obtained. In transmitted light it displays a pure light blue or deeper blue tint, and in reflected light, a soft reddish brown.

If a strong solution of gold chloride, as has already been described, is introduced into styrol containing more than 10% of styrol glass, the colloidal gold during the polymerization step does not have time to become evenly distributed throughout the glass, and the product is colorless in some places and cloudy in others.

The color that styrol glass takes on under the action of silver nitrate depends upon the following conditions: (1) concentration of the silver nitrate used (2) duration and temperature of the polymerization (3) purity of the silver nitrate.

Pure silver nitrate usually colors styrol glass to various shades of brown, or to a very dark, almost black color. When containing salt to the amount of 0.001%, glass is produced which even in a thick sheet (about 10 cm.) has a scarcely noticeable brown tint. In the presence of 0.01% of silver nitrate the resulting glass is almost opaque when in a thick sheet, but in transmitted light it shows brown whilst in reflected light it is likewise opaque, opalescing with a dark brown, almost black color with a curious greenish reflection.

Impure silver nitrate which tarnishes when exposed to daylight or in a moist atmosphere, produces more interesting and varied colorings. For this purpose silver nitrate was used which had been recovered from the silver chloride obtained from the fixing solutions used in photography. Glass which contains 0.001% of such silver salts (polymerization is kept up for 15 hours at 140° C.) acquires a pure golden-yellow color and does not opalesce. When the content of silver nitrate approximates 0.013% the glass takes on a lovely dark red color, but in reflected light it shows opaque and whitish-gray of a most curious shade. In a thin sheet it displays a peculiar green fluorescence. Analogous results were obtained with 0.04% of silver nitrate; when the content is reduced to 0.008% an interesting reddish-brown color, without any fluorescence is obtained.

To 20 gms. of styrol containing 1–3% of styrol glass, 5 ccm. of a solution of 0.02 gms. of silver nitrate in 50 ccm. of styrol which likewise contains 1–3% of styrol glass, are added, the temperature being raised gradually. This mixture is heated with a reflux (air) condenser for 12 hours at 175° C. In the end styrol glass containing 0.008% of silver nitrate is obtained. For coloring glass of this kind see above.

Silver nitrate also possesses the property, even when present in amounts as small as 0.001%, of rendering the styrol glass more durable, pliable and resilient.

While the word dyestuff has been used to indicate organic compounds, it is understood that the terms dyestuff and coloring material both include inorganic compounds, the real criteria being those of solubility in styrol and styrol glass and ability to impart a color to the glass.

The process is also applicable to the light colored resins and resinous products, known as condensation products provided the coloring materials are soluble in these products and are unaffected by the temperatures reached in forming the resins. The process may also be used in coloring the beta or brittle modification of polymerized styrol, as well as to other modifications and to mixtures of the several modifications of styrol glass.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for producing colored polymerized styrols which comprises forming styrol solutions of coloring material soluble in styrols and in their polymers and polymerizing the solution to form polymerized styrols.

2. A process for producing colored polymerized styrols which comprises dissolving in styrols coloring material which is capable of withstanding the temperatures reached during polymerization of the styrols, and polymerizing the styrols.

3. A process for producing colored polymerized styrols which comprises adding to unpolymerized styrols coloring material capable of dissolving in styrol and in polymerized styrols, and adapted to retain substantially the original intensity of color, polymerizing said solution of coloring material in styrol to form polymerized styrols.

4. A process for producing colored vitreous polymerized styrols which comprises dissolving in unpolymerized styrols coloring material which is soluble in vitreous polymerized styrol, and heating the solution of coloring material in unpolymerized styrol to bring about polymerization of said solution to form the vitreous polymer thereof without substantially changing the intensity of the coloring material.

5. A process for producing colored vitreous polymerized styrols which comprises dissolving in unpolymerized styrol coloring material which is soluble in vitreous polymerized styrol, and heating the solution at 140°–180° C. to form a homogeneously colored vitreous polymerized styrol.

6. A process for producing colored vitreous polymerized styrols which comprises dissolving in unpolymerized styrol coloring material which is soluble in vitreous polymerized styrol and is inert towards by-products formed during polymerization of styrol and heating the solution of coloring material in unpolymerized styrol at 140° to 180° C. to form a colored vitreous polymerized styrol.

7. A process for producing colored vitreous polymerized styrol which comprising dissolving in unpolymerized styrol fluorescing coloring material which is soluble in vitreous polymerized styrol and polymerizing the solution at approximately 140° to 180° C. to form a fluorescent vitreous polymerized styrol.

8. A process for producing colored vitreous polymerized styrols which comprises dissolving coloring material of the fluorindine series in unpolymerized styrol, and polymerizing the solution at approximately 140° to 180° C. to form a colored vitreous polymerized styrol.

9. In a process for producing colored vitreous polymerized styrols, wherein coloring material is dissolved in styrol, and the solution polymerized to vitreous polymerized styrol, the step of changing the color imparted by the free base of a fluorindine to said polymer, which comprises subjecting the polymerized styrol to the action of a material adapted to diffuse through the polymer and to react with said free base to change its color.

10. In a process for producing colored vitreous polymerized styrols, wherein coloring material is dissolved in styrol, and the solution polymerized to vitreous polymerized styrol, the step of changing the color imparted by the free base of a fluorindine to said polymer, which comprises treating the polymerized styrol with an acid adapted to diffuse through said polymer and to change the color of the free base.

11. As new products, polymerized styrols containing dissolved therein coloring material whose intensity-change temperatures lie without the polymerization temperatures of styrol.

12. As new products, homogeneously colored vitreous polymerized styrols.

13. As new products, homogeneously colored transparent vitreous polymerized styrols.

14. As new products, homogeneously colored transparent vitreous polymerized styrols which are fluorescent.

15. As new products, vitreous polymerized styrols colored with a fluorindine.

Signed at Cromwell, county of Middlesex and State of Connecticut, this 26th day of January, 1925.

IWAN OSTROMISLENSKY.